(12) United States Patent
Slack (10) Patent No.: US 11,372,384 B2
(45) Date of Patent: Jun. 28, 2022

(54) SYSTEM AND METHOD FOR ADJUSTING A MULTI-DIMENSIONAL OPERATING SPACE OF A WIND TURBINE

(71) Applicant: General Electric Company, Schenectady, NY (US)

(72) Inventor: Robert Peter Slack, Seattle, WA (US)

(73) Assignee: General Electric Company, Schenectady, NY (US)

( * ) Notice: Subject to any disclaimer, the term of this patent is extended or adjusted under 35 U.S.C. 154(b) by 434 days.

(21) Appl. No.: 16/573,024

(22) Filed: Sep. 17, 2019

(65) Prior Publication Data
US 2021/0079891 A1    Mar. 18, 2021

(51) Int. Cl.
*G05D 3/12*    (2006.01)
*G05B 19/04*    (2006.01)
(Continued)

(52) U.S. Cl.
CPC ........... *G05B 19/0415* (2013.01); *F03D 7/00* (2013.01); *F03D 7/0224* (2013.01);
(Continued)

(58) Field of Classification Search
CPC ........ G05B 19/0514; G05B 2219/2619; F03D 7/045; F05B 2270/1031; F05B 2270/325; F05B 2270/333; F05B 2270/335
(Continued)

(56) References Cited

U.S. PATENT DOCUMENTS

| 7,999,406 B2 | 8/2011 | Cardinal et al. |
| 9,845,790 B2 | 12/2017 | de Boer et al. |

(Continued)

FOREIGN PATENT DOCUMENTS

| CN | 103855715 B | 10/2016 |
| CN | 106168195 A | 11/2016 |
| WO | WO2017/050338 A1 | 3/2017 |

OTHER PUBLICATIONS

European Search Report for EP Application No. 20196689.2, dated Feb. 5, 2021.

*Primary Examiner* — Tulsidas C Patel
*Assistant Examiner* — Thomas K Quigley
(74) *Attorney, Agent, or Firm* — Dority & Manning, P.A.

(57) ABSTRACT

A method for adjusting a multi-dimensional operating space of a wind turbine includes receiving, via a central multi-dimensional operating space controller, a plurality of signals from a plurality of requestors of modified operating space. Each of the plurality of signals includes a data structure having requested set points for a plurality of dimensions in the operating space. The method also includes tracking, via the central multi-dimensional operating space controller, current set points for the plurality of dimensions in the operating space. Further, the method includes dynamically determining, via the central multi-dimensional operating space controller, an output signal based on the requested set points, the output signal comprising one or more changes for the current set points for the plurality of dimensions in the operating space. Moreover, the method includes controlling the wind turbine based on the output signal so as to provide a modified multi-dimensional operating space.

20 Claims, 6 Drawing Sheets

(51) Int. Cl.
*F03D 7/04* (2006.01)
*F03D 7/00* (2006.01)
*F03D 17/00* (2016.01)
*F03D 7/02* (2006.01)

(52) U.S. Cl.
CPC .......... *F03D 7/0276* (2013.01); *F03D 7/045* (2013.01); *F03D 17/00* (2016.05); *F05B 2270/1031* (2013.01); *F05B 2270/325* (2013.01); *F05B 2270/333* (2013.01); *F05B 2270/335* (2013.01); *G05B 2219/2619* (2013.01)

(58) Field of Classification Search
USPC ....................................................... 700/287
See application file for complete search history.

(56) References Cited

U.S. PATENT DOCUMENTS

| | | | |
|---|---|---|---|
| 10,006,437 B2 | 6/2018 | Bohme et al. | |
| 10,359,026 B2 | 7/2019 | Kjaer et al. | |
| 2015/0118047 A1 | 4/2015 | Yoon et al. | |
| 2015/0370228 A1* | 12/2015 | Kohn | B60W 10/06 700/287 |
| 2015/0370232 A1* | 12/2015 | Kohn | G06Q 10/06315 700/287 |
| 2016/0341179 A1 | 11/2016 | Klodowski et al. | |
| 2018/0171974 A1 | 6/2018 | Kjaer et al. | |

* cited by examiner

SYSTEM AND METHOD FOR ADJUSTING A MULTI-DIMENSIONAL OPERATING SPACE OF A WIND TURBINE

FIELD

The present disclosure relates generally to wind turbines and, more particularly, to a system and method for adjusting a multi-dimensional operating space of a wind turbine.

BACKGROUND

Wind power is considered one of the cleanest, most environmentally friendly energy sources presently available and wind turbines have gained increased attention in this regard. A modern wind turbine typically includes a tower, a generator, a gearbox, a nacelle, and one or more rotor blades. The rotor blades are the primary elements for converting wind energy into electrical energy. The blades typically have the cross-sectional profile of an airfoil such that, during operation, air flows over the blade producing a pressure difference between its sides. Consequently, a lift force, which is directed from the pressure side towards the suction side, acts on the blade. The lift force generates torque on the main rotor shaft, which is connected to a generator for producing electricity.

The operating space of a wind turbine may be thought of as the nominal values, schedules and/or limits on set points within the broadly-considered control system. Thus, operating space dimensions may include but are not limited to nominal target tip speed ratio, rotor minimum grid-connected speed, rotor maximum speed, maximum power output, minimum power output, speed and power set points, maximum rotor thrust, thrust set point, minimum or maximum blade pitch angles, blade pitch angle offsets and/or limits thereto, storm wind speeds leading to shut down or reduced operation, reactive power targets and limits, etc.

In the early wind industry, many wind turbines were designed to operate at a fixed speed, a fixed power level, and fixed pitch. Controls were relatively simple, existing even in electrical circuits prior to the development of digital controllers. IN such instances, a wind turbine might start up, operate within its fixed operating space, and shut down if any event occurred that was not compatible with the default space. Over decades in the wind industry, along with other developments, wind turbines have incrementally been required to be capable of more incremental adjustments to operating power, operating noise level, and other aspects to accommodate different operating circumstances without such a drastic measure as shutting down, thereby losing all energy production.

Similarly, the wind industry has recognized that in certain highly ideal operating circumstances, some adjustments to the operating space may be in the "upwards" direction, augmenting speed or power for instance to capture more energy from the wind in especially benign conditions. Initial software architectures to handle such adjustments to operating space were simple, as the number of dimensions being adjusted was small.

Development of special purpose single-dimension curtailment handlers became common in the industry, for instance, to reduce a maximum power level in response to a curtailment request from the grid, or to increase a pitch angle to reduce power or noise level. As the industry evolved, more reasons for customization of the operating space came into play. For example, a wind turbine might reduce power to reduce heat generation in various electrical components in hot weather or might operate in some form of a safe mode when certain sensors were unavailable.

These examples have continued to increase over the years (from very few to as many as dozens) and are generally referred to herein as Requestors of Modified Operating Space (RMOS). More specifically, viewed in full granularity, there may be dozens of component over-temperatures that qualify as RMOS in the system to, for instance, reduce heat-producing power throughput in an area of interest. Some RMOS may ultimately originate from an outside wind farm management authority or system, while others may originate from local site wind farm level management. Still others may originate from monitoring systems for conditions and components local to a specific wind turbine, implemented in hardware, software, or a central park server. There may be several RMOS relating to wind quality e.g. high turbulence or low turbulence, high shear or low shear, daytime or nighttime conditions. Further, there may be multiple RMOS related to sensors that become unavailable, assuming the wind turbine design can run at reduced levels without certain sensory information. Accordingly, noise RMOS, grid capacity RMOS, and similar exist, easily increasing the number of overall RMOS.

Accordingly, in recent years, wind turbine control strategies have evolved from simple single-input-single-output constructions into more complicated model-based, multi-variable, and modern control strategies. More specifically, operating strategies have become more intricately featured to maximize energy capture in many special conditions and circumstances, such as especially quiescent or turbulent winds, especially high or low temperatures, absence of certain sensory information, etc.

Figure 1:
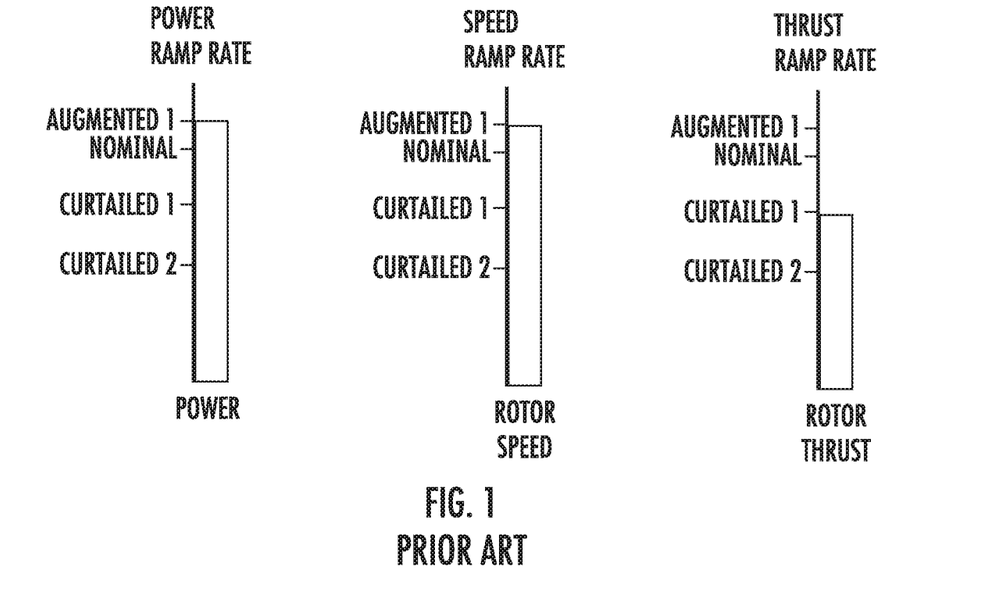
FIG. 1 illustrates a schematic diagram of a parallel single-dimensional ramping approach for operating a wind turbine according to conventional construction.

Moreover, conventional curtailment is limited (such as reduction in power or increase in fine pitch angle) and often involves only a single dimension. For example, as shown in FIG. 1, the parallel single-dimensional ramping approach is represented. As shown, power, rotor speed, and thrust are chosen for purposes of illustration, but those skilled in the art can appreciate any suitable combination of dimensions are applicable. Further, as shown, the power, rotor speed, and thrust each have multiple levels that may be adjusted to in different forms of curtailment or augmented operation. In this example, each dimension has its own ramp rate independently defined. Thus, in one example, if power makes a large change at a slow rate, and the rotor speed makes a small change at a fast rate, the rotor speed will finish its transition first and power will continue changing for some time after. In certain directions and combinations, this sort of effect can lead the turbine transiently through undesirable operating points.

Figure 2:
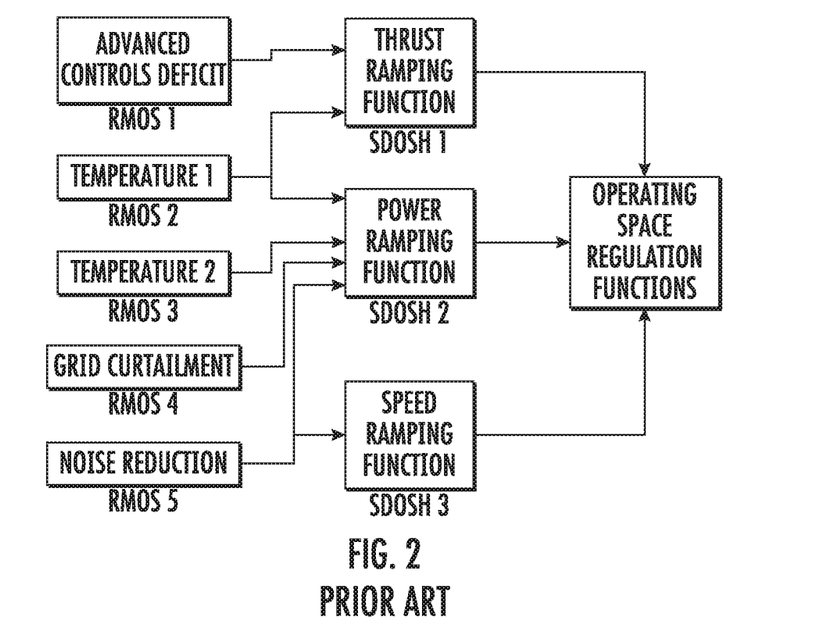
FIG. 2 illustrates a schematic flow diagram of multi-dimensional control of a wind turbine according to conventional construction.

As the industry seeks to minimize cost of energy, more optimal approaches for curtailment have been continually sought out and more frequently involve changes in multiple dimensions of the operating space of the wind turbine (rotor speed and power, thrust and rotor speed, minimum pitch angle and rotor speed as arbitrary examples of combinations). These changes in multiple dimensions of the operating space are often able to protect the wind turbine with a minimal amount of lost energy relative to the nominal operating space of the turbine. However, software architecture developments have not maintained pace to best handle multi-dimensional changes in the operating space, and may continue to treat a multi-dimensional change in the operating space like a large set of unrelated unidimensional reductions. For example, as shown in FIG. 2, a schematic flow diagram of conventional multi-dimensional control of a wind turbine is illustrated. As shown at RMOS 1, the Advanced Controls Deficit module changes only the thrust dimension of the operating space, and therefore sends only a thrust level request to a unidimensional prioritization and a single dimensional operating space handler (SDOSH 1). Further, as shown at RMOS 2, the Temperature 1 module sends a thrust request to the thrust unidimensional handler SDOSH 1 and a power request to a power unidimensional handler (SDOSH 2). Moreover, as shown at RMOS 3, the Temperature 2 module sends only a power request to a power unidimensional handler SDOSH 2 as does the Grid Curtailment module (RMOS 4). The Noise Reduction module (RMOS 5) also sends a power request to the power unidimensional handler SDOSH 2 and a speed request to a speed unidimensional handler SDOSH 3. The handlers (SDOSH 1, 2, and 3) each prioritize the requests, track effects, and forward set points or limits to operating space regulation functions in the turbine control software. However, the individual-dimension-oriented architecture inherently limits cross-visibility and coordination between dimensions of operating space curtailment or augmentation.

For at least the aforementioned reasons relating to increasing RMOS and adaptability, improved systems for handling concurrent and/or dynamic multi-dimensional modifications to wind turbine operating spaces are of interest in the art. In addition, it is desirable in the art to have an approach and construction that handles the transition (not as independent ramps on separate levels), but as a single coordinated path through operating space.

BRIEF DESCRIPTION

Aspects and advantages of the invention will be set forth in part in the following description, or may be obvious from the description, or may be learned through practice of the invention.

In one aspect, the present disclosure is directed to a method for adjusting a multi-dimensional operating space of a wind turbine. The method includes receiving, via a central multi-dimensional operating space controller (e.g. MDOSC), a plurality of signals from a plurality of requestors of modified operating space. Each of the plurality of signals from the plurality of requestors of modified operating space includes a data structure having requested set points for a plurality of dimensions in the operating space. The method also includes tracking, via the central multi-dimensional operating space controller, current set points for the plurality of dimensions in the operating space. Further, the method includes dynamically determining, via the central multi-dimensional operating space controller, an output signal based on the requested set points, the output signal comprising one or more changes (e.g. step and/or dynamic increases or decreases) for the current set points for the plurality of dimensions in the operating space. Moreover, the method includes controlling the wind turbine based on the output signal so as to provide a modified multi-dimensional operating space.

In an embodiment, dynamically determining the output signal based on the requested set points may include dynamically determining the output signal via a computer-implemented model stored in the central multi-dimensional operating space controller.

In another embodiment, dynamically determining the output signal based on the requested set points may include calculating an effect of each of the plurality of signals from the plurality of requestors of modified operating space on at least one at least one of active power or reactive power.

In such embodiments, the method may also include prioritizing, via the central multi-dimensional operating space controller, the plurality of signals from the plurality of requestors of modified operating space with respect to the effect of each of the plurality of signals on at least one at least one of the active power or the reactive power. Thus, in certain embodiments, dynamically determining the output signal based on the requested set points may include selecting, via the central multi-dimensional operating space controller, one of the data structures from the plurality of requestors of modified operating space based on the prioritization such that at least one of the active power or the reactive power is maximized, and/or mechanical loading of the wind turbine structure is minimized, and/or some combination of the two is optimized or near-optimized according to heuristics.

In additional embodiments, the method may include dynamically determining, via the central multi-dimensional operating space controller, coordinated multi-dimensional transition paths in response to the one or more changes for the current set points for the plurality of dimensions in the operating space.

In an embodiment, the method may include receiving, via the central multi-dimensional operating space controller, a transition rate for each of the requested set points for the plurality of dimensions in the operating space and determining a limiting requestor of the plurality of requestors of modified operating space with respect to the transition rates. In such embodiments, the method may include reducing transition rates of the plurality of requestors of modified operating space to a limited transition rate of the limiting requestor such that each of the plurality of requestors of modified operating space begin and end transitioning at the same time. In another embodiment, the method may include coordinating the reducing of the transition rates of the plurality of requestors of modified operating space to affect a linear transition path between operating spaces.

In particular embodiments, each data structure of each of the plurality of signals from the plurality of requestors of modified operating space may have a standard, identical format.

In further embodiments, the requestors of the modified operating space may originate from monitoring systems of components of the wind turbine, a management system of a wind farm containing the wind turbine, a management system outside of the wind farm, monitoring systems of wind conditions at the wind turbine or in the wind farm, and/or a power grid connected to the wind turbine or the wind farm. In addition, the requestors of the modified operating space may be, for example, temperature, grid curtailment, noise reduction, power curtailment, sensor status, and/or any other requestor of modified operating space.

In several embodiments, the plurality of dimensions may include, for example, tip speed ratio, rotor speed, generator speed, active power, reactive power, pitch angle, wind speed limits, thrust, and/or any other suitable operating parameter.

In another aspect, the present disclosure is directed to a system for adjusting a multi-dimensional operating space of a wind turbine. The system includes a plurality of requestors of modified operating space, a central multi-dimensional operating space controller communicatively coupled to each of the requestors of modified operating space, and a controller communicatively coupled to the central multi-dimensional operating space controller. The central multi-dimensional operating space controller may be configured to perform a plurality of operations, including but not limited receiving a plurality of signals from the plurality of requestors of modified operating space, with each of the plurality of signals from the plurality of requestors of modified operating space comprising a data structure that includes requested set points for a plurality of dimensions in the operating space, tracking current set points for the plurality of dimensions in the operating space, and dynamically determining an output signal based on the requested set points, the output signal comprising one or more changes for the current set points for the plurality of dimensions in the operating space. As such, the controller is configured to control the wind turbine based on the output signal so as to provide a modified multi-dimensional operating space. It should be understood that the system may further be configured with any of the features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to systems and methods for more organized and coordinated real-time change to the multi-dimensional operating space of a wind turbine. Operating space dimensions such as but not limited to tip speed ratio, rotor speed, active power, pitch angle and thrust set points are handled multi-dimensionally. Requestors of modified operating space (RMOS) can be defined in various hardware and software of the system to provide a standard format multi-dimensional input to a central multi-dimensional operating space controller within the turbine control system. The turbine control system can then better calculate the relative effects of each RMOS on system key outputs such as active power, and better attribute key concerns such as lost energy to precise RMOS root causes. In addition, the turbine control system may be enabled to better manage transition paths (multi-dimensional ramps) that are concurrent or overlapping from single or multiple RMOS. This multi-dimensional operating space management approach simplifies and clarifies the wind turbine software design and maintenance for this set of wind turbine functionalities, while providing better operating space transition behavior and clarity to machine operators.

Figure 3:
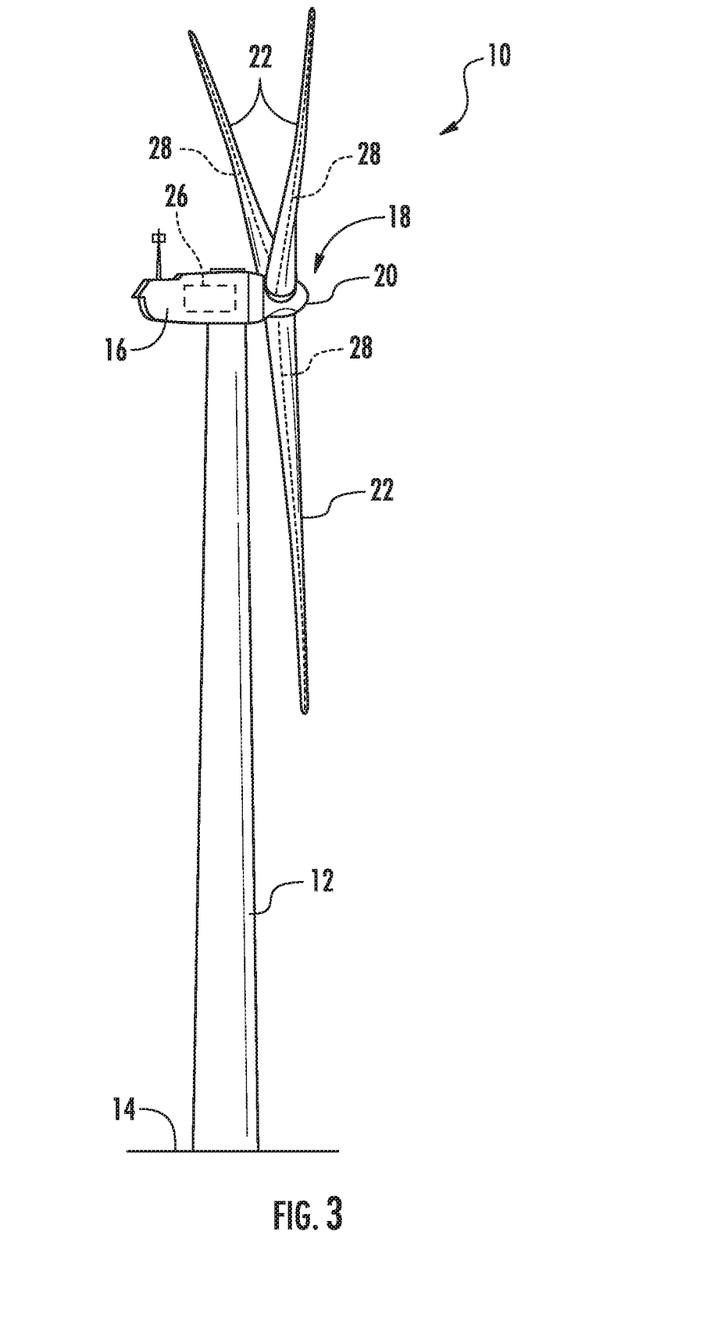
FIG. 3 illustrates a perspective view of one embodiment of a wind turbine according to the present disclosure.

Referring now to the drawings, FIG. 3 illustrates a perspective view of one embodiment of a wind turbine 10 configured to implement the control technology according to the present disclosure. It should be understood that the wind turbine 10 of FIG. 3 is provided as an example field of use but is not meant to be limiting. Still further embodiments may include gas turbines, jet engines, wind turbines at the farm-level, and/or additional technologies as well. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a corrective action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes of the wind turbine 10 (e.g., start-up or shut-down sequences), de-rate the wind turbine 10, and/or control various components of the wind turbine 10. For example, the controller 26 may be configured to control the blade pitch or pitch angle of each of the rotor blades 22 (i.e., an angle that determines a perspective of the rotor blades 22 with respect to the direction of the wind) to control the power output generated by the wind turbine 10 by adjusting an angular position of at least one rotor blade 22 relative to the wind. For instance, the controller 26 may control the pitch angle of the rotor blades 22 by rotating the rotor blades 22 about a pitch axis 28, either individually or simultaneously, by transmitting suitable control signals to a pitch drive or pitch adjustment mechanism (not shown) of the wind turbine 10.

Figure 4:
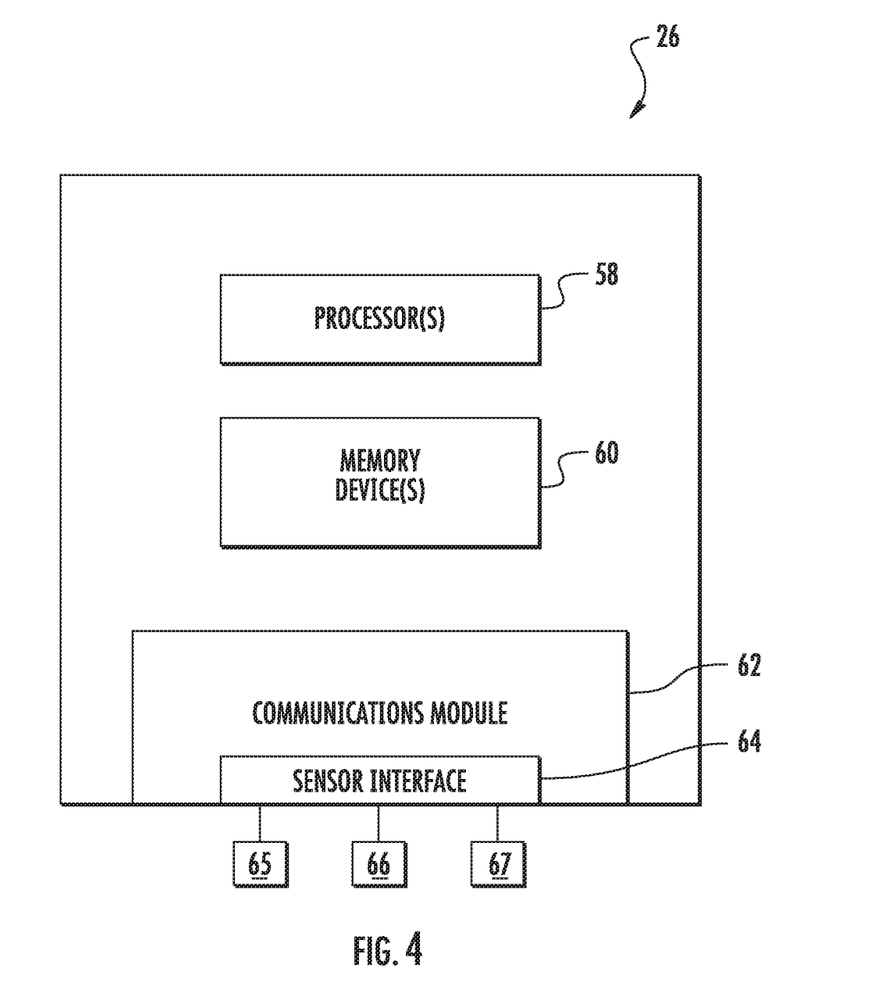
FIG. 4 illustrates a schematic view of one embodiment of suitable components that may be included within a turbine controller of the wind turbine shown in FIG. 3.

Referring now to FIG. 4, a block diagram of one embodiment of suitable components that may be included within the controller 26 is illustrated in accordance with aspects of the present subject matter. As shown, the controller 26 may include one or more processor(s) 58 and associated memory device(s) 60 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Additionally, the controller 26 may also include a communications module 62 to facilitate communications between the controller 26 and the various components of the wind turbine 10. For instance, the communications module 62 may include a sensor interface 64 (e.g., one or more analog-to-digital converters) to permit the signals transmitted by one or more sensors 65, 66, 67 to be converted into signals that can be understood and processed by the controller 26. It should be appreciated that the sensors 65, 66, 67 may be communicatively coupled to the communications module 62 using any suitable means. For example, as shown in FIG. 4, the sensors 65, 66, 67 are coupled to the sensor interface 64 via a wired connection. However, in other embodiments, the sensors 65, 66, 67 may be coupled to the sensor interface 64 via a wireless connection, such as by using any suitable wireless communications protocol known in the art. As such, the processor 58 may be configured to receive one or more signals from the sensors 65, 66, 67.

The sensors 65, 66, 67 of the wind turbine 10 may be any suitable sensors configured to measure any operating condition or wind parameter at or near the wind turbine. For example, the sensors 65, 66, 67 may include blade sensors for measuring a pitch angle of one of the rotor blades 22 or for measuring a loading acting on one of the rotor blades 22; generator sensors for monitoring the generator (e.g. torque, rotational speed, acceleration and/or the power output); and/or various wind sensors for measuring various wind parameters. Further, the sensors 65, 66, 67 may be characteristic turbulence intensity sensors, that directly or indirectly measure a characteristic turbulence intensity near the wind turbine 10. In addition, the sensors 65, 66, 67 may be located near the ground of the wind turbine, on the nacelle, or on a meteorological mast of the wind turbine. It should also be understood that any other number or type of sensors may be employed and at any location. For example, the sensors may be accelerometers, pressure sensors, angle of attack sensors, vibration sensors, MIMU sensors, camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, and/or any other suitable sensors. It should be appreciated that, as used herein, the term "monitor" and variations thereof indicates that the various sensors of the wind turbine may be configured to provide a direct measurement of the parameters being monitored or an indirect measurement of such parameters. Thus, the sensors 65, 66, 67 may, for example, be used to generate signals relating to the parameter being monitored, which can then be utilized by the controller 26 to determine the actual condition.

Figure 5:
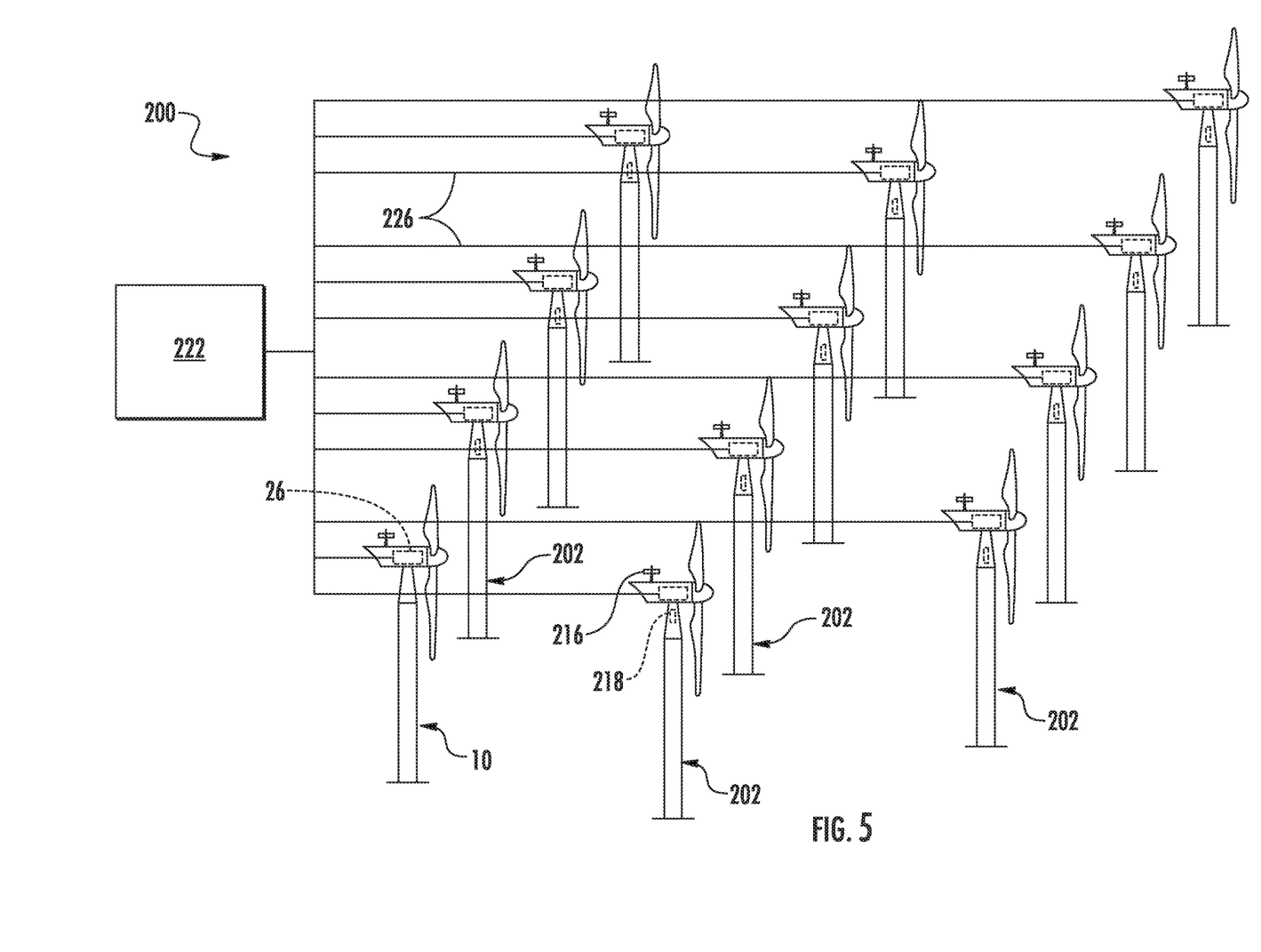
FIG. 5 illustrates a schematic diagram of one embodiment of a wind farm according to the present disclosure.

Referring now to FIG. 5, the system and method as described herein may also be combined with a wind farm controller 222 of a wind farm 200. As shown, the wind farm 200 may include a plurality of wind turbines 202, including the wind turbine 10 described above. For example, as shown in the illustrated embodiment, the wind farm 200 includes twelve wind turbines, including wind turbine 10. However, in other embodiments, the wind farm 200 may include any other number of wind turbines, such as less than twelve wind turbines or greater than twelve wind turbines. In one embodiment, the controller 26 of wind turbine 10 may be communicatively coupled to the farm controller 222 through a wired connection, such as by connecting the controller 26 through suitable communicative links 226 (e.g., a suitable cable). Alternatively, the controller 26 may be communicatively coupled to the farm controller 222 through a wireless connection, such as by using any suitable wireless communications protocol known in the art.

In several embodiments, one or more of the wind turbines 202 in the wind farm 200 may include a plurality of sensors for monitoring various operating parameters/conditions of the wind turbines. For example, as shown, one of the wind turbines 202 includes a wind sensor 216, such as an anemometer or any other suitable device, configured for measuring wind speeds. As is generally understood, wind speeds may vary significantly across a wind farm 200. Thus, the wind sensor(s) 216 may allow for the local wind speed at each wind turbine 202 to be monitored. In addition, the wind turbine 202 may also include an additional sensor 218. For instance, the sensors 218 may be configured to monitor electrical properties of the output of the generator of each wind turbine 202, such as current sensors, voltage sensors, temperature sensors, or power monitors that monitor power output directly based on current and voltage measurements. Alternatively, the sensors 218 may comprise any other sensors that may be utilized to monitor the power output of a wind turbine 202. It should also be understood that the wind turbines 202 in the wind farm 200 may include any other suitable sensor known in the art for measuring and/or monitoring wind conditions and/or wind turbine conditions.

Figure 6:
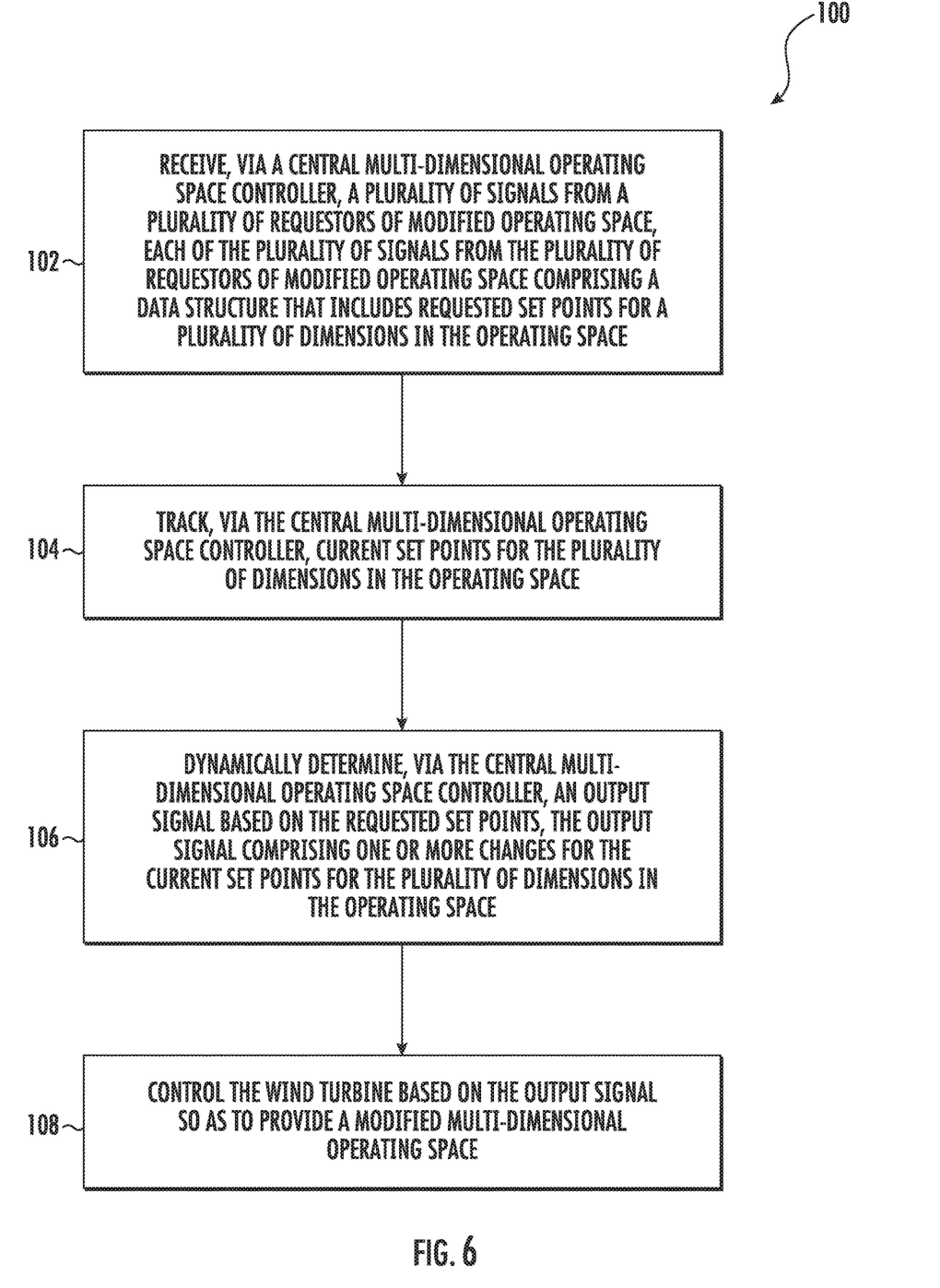
FIG. 6 illustrates a flow diagram of one embodiment of a method for adjusting a multi-dimensional operating space of a wind turbine according to the present disclosure.
Figure 7:
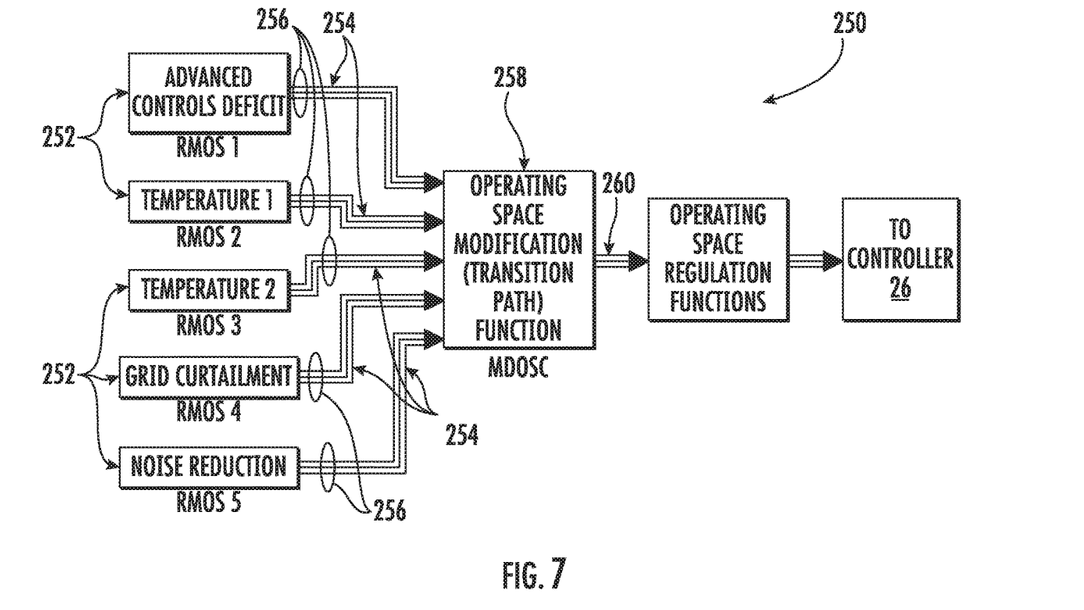
FIG. 7 illustrates a schematic diagram of one embodiment of a system for adjusting a multi-dimensional operating space of a wind turbine according to the present disclosure.

Referring now to FIGS. 6 and 7, the present disclosure is directed to systems and methods for adjusting a multi-dimensional operating space of a wind turbine in accordance with aspects of the present disclosure. More particularly, FIG. 6 illustrates a flow diagram of one embodiment of a method 100 for adjusting a multi-dimensional operating space of a wind turbine in accordance with aspects of the present disclosure. FIG. 7 illustrates a schematic diagram of one embodiment of a system 250 for adjusting a multi-dimensional operating space of a wind turbine in accordance with aspects of the present disclosure.

In general, as shown in FIG. 6, the method 100 is described herein as implemented for operating the wind turbine 10 and/or wind farm 200 described above. However, it should be appreciated that the disclosed method 100 may be used to operate any other wind turbine and/or wind farm having any suitable configuration. In addition, although FIG. 6 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (102), the method 100 includes receiving, via a central multi-dimensional operating space controller 258 (also labeled MDOSC), a plurality of signals 254 from a plurality of requestors of modified operating space 252 (labeled RMOS 1, RMOS 2, RMOS, 3, RMOS 4, RMOS 5, and so on). More specifically, as shown in FIG. 7, the Advanced Controls Deficient module (as compared to the prior art system of FIG. 1) may still only request a real change in thrust level, but it explicitly sends an operating space set of signals (or data structure 256) that explicitly calls out levels (requests or non-requests) relating to all dimensions of the operating space. Further, as shown, the remaining plurality of signals 254 from the plurality of requestors of modified operating space 252 may also include a data structure 256 having requested set points for a plurality of dimensions in the operating space. In particular embodiments, each data structure 256 of each of the plurality of signals 254 from the plurality of requestors of modified operating space 252 may have a standard, identical format, even if they only make real change requests on a subset of the operating space dimensions. Those skilled in the art will appreciate that a request structure may take many different literal forms, from a literal variable array to a defined set of signals, to a data structure including variable types, etc. and other as-yet-unforeseen options that are still within the scope of the invention.

As described herein, the requestors of the modified operating space 252 may originate from monitoring systems of components of the wind turbine 10 (such as from sensors 65, 66, 67), a management system of the wind farm 200 containing the wind turbine 10 (such as from the farm-level controller 202), a management system outside of the wind farm 200, monitoring systems of wind conditions at the wind turbine 10 or in the wind farm 200 (such as from sensors 216), and/or a power grid connected to the wind turbine 10 and/or the wind farm 200. In addition, as shown in FIG. 7, the requestors of the modified operating space 252 may include, for example, various temperatures, grid curtailment, noise reduction, power curtailment, sensor status, and/or any other suitable requestor of modified operating space. In addition, in several embodiments, the dimensions described herein, may include, for example, tip speed ratio, rotor speed, generator speed, active power, reactive power, pitch angle, wind speed limits, thrust, and/or any other suitable operating parameter.

Referring back to FIG. 6, as shown at (104), the method 100 includes tracking, via the central multi-dimensional operating space controller 258, current set points for the plurality of dimensions in the operating space. More specifically, in certain embodiments, the central multi-dimensional operating space controller 258 may be configured to track all current dimensions of the operating space as defined by the output signal 260 of the MDOSC function. In addition, the central multi-dimensional operating space controller 258 may be configured to track all newly requested dimensions of operating space as received from all RMOS modules 252.

Moreover, as shown at (106) in FIG. 6, the method 100 includes dynamically determining, via the central multi-dimensional operating space controller 258, the output signal 260 based on the requested set points from the requestors of the modified operating space 252. As such, the output signal 260 includes one or more changes (e.g. step and/or dynamic increases or decreases) for the current set points for the plurality of dimensions in the operating space.

In an embodiment, the central multi-dimensional operating space controller 258 may be configured to dynamically determine the output signal 260 based on the requested set points using a computer-implemented model stored therein. For example, in one embodiment, the central multi-dimensional operating space controller 258 may be configured to dynamically determine the output signal 260 based on the requested set points by calculating an effect of each of the plurality of signals 254 from the plurality of requestors of modified operating space 252 on active power output and/or reactive power output.

It is worth noting here that the calculation of effect of each requested modification of operating space allows determination of the "most restrictive" with respect to energy capture, and accounting of the energy losses or gains into bins representing different RMOS (a certain amount of energy loss for noise reduced operation, a certain amount of gain for low turbulence intensity operation, a certain amount of loss for temperature curtailment, etc.)

In such embodiments, the central multi-dimensional operating space controller 258 may also be configured to prioritize the plurality of signals from the plurality of requestors of modified operating space 252 with respect to the effect of each of the plurality of signals 254 on active power output and/or reactive power output. Thus, in certain embodiments, the central multi-dimensional operating space controller 258 may be configured to select one of the data structures 256 from the plurality of requestors of modified operating space 252 based on the prioritization such that the active power output and/or reactive power output is maximized.

For example, in an embodiment, the central multi-dimensional operating space controller 258 may be configured to receive the least of all requested power levels, the least of all requested speeds, the least of all requested thrusts, and may then ramp multi-dimensionally and linearly, while taking into account the step size in each dimension and acceptable maximum ramp rate in each dimension. In such an embodiment, the central multi-dimensional operating space controller 258 may then determine the governing dimension that takes the longest time to transition. The rates of the non-governing dimensions can thus be clocked down so that with linear ramp, all dimensions will start and finish at the same time as the governing dimension in transition. In this way, a linear transition in multi-dimensional space is constructed and path followed. In specific embodiments, the central multi-dimensional operating space controller 258 may take the lowest power, lowest speed, lowest thrust, lowest reactive power, highest minimum pitch angle, and so on, and may generally select the least aggressive operation in each dimension of the space. Though prioritization may take the form of the lowest of all power requests, highest of all minimum pitch requests (for a pitch-to-feather regulated turbine design), lowest of all speed requests, etc. as described above, it should be understood that the prioritization may use alternate logic that is not always the least aggressive operation in each dimension.

In an example, typical prioritization exists in certain dimensions, such as if two RMOS request adjusted power levels, almost always the lower of the two would be taken. If two minimum pitch angles were requested from separate RMOS, almost always the higher of the two would be taken. However, in certain instances, there are some cases where on-board logic might prioritize differently than the almost-always directions according to mechanical loads, power, etc.

In additional embodiments, the central multi-dimensional operating space controller 258 may be further configured to dynamically determine coordinated multi-dimensional transition paths in response to the one or more changes for the current set points for the plurality of dimensions in the operating space.

Figure 8:
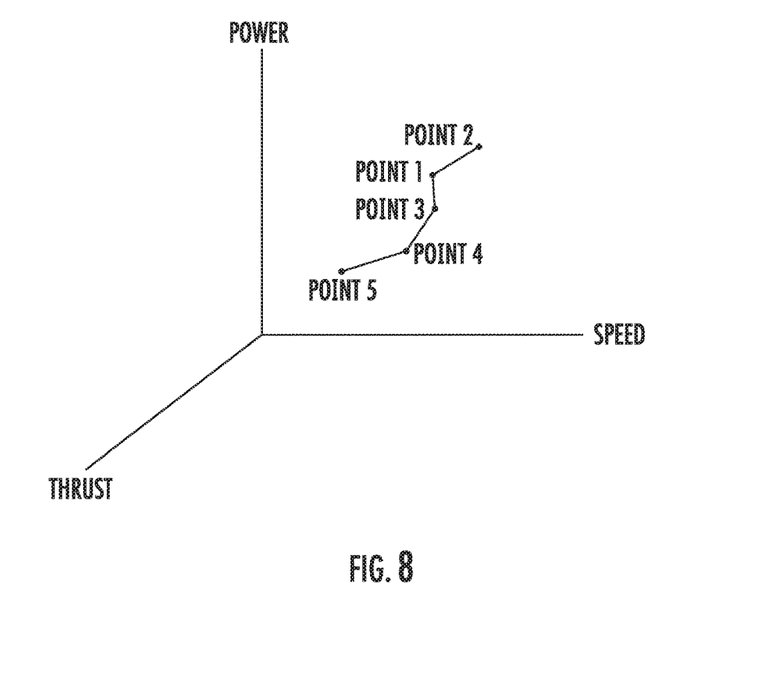
FIG. 8 illustrates a graph of one embodiment of a multi-dimensional operating space construction for the wind turbine according to the present disclosure.

In an embodiment, the central multi-dimensional operating space controller 258 may be configured to receive or may otherwise know a transition rate (that can be a default or maximum transition rate) for each of the requested set points for the plurality of dimensions in the operating space and determine a limiting requestor of the plurality of requestors of modified operating space 252 with respect to the transition rates. In such embodiments, as mentioned above, the central multi-dimensional operating space controller 258 may be configured to evaluate step size and maximum ramp rate for each dimension, to determine a limiting transition rate/time value and reduce transition rates of the plurality of requestors of modified operating space 252 to a limited transition rate of the limiting requestor such that each of the plurality of requestors 252 of modified operating space begin and end transitioning at the same time. In another embodiment, the central multi-dimensional operating space controller 258 may be configured to coordinate reducing of the transition rates of the plurality of requestors of modified operating space 252 to affect a linear transition path between operating spaces. For example, FIG. 8 illustrates a graph of one embodiment of a multi-dimensional operating space construction for the wind turbine 10 according to the present disclosure, particularly illustrating a transition path divided into multiple linear paths. More specifically, FIG. 8 assists in illustrating an advantage of the present disclosure, which is the ability of the software within the central multi-dimensional operating space controller 258 to handle the transitions within the operating space as inherently multi-dimensional, using transition paths defined by coordinated ramp rates across dimensions. More specifically, as shown, the illustrated graph includes the dimensions of power, thrust, and speed, which are provided for illustrative purposes only. Further, as shown, points 1-2, 2-3, 3-4 and 4-5 are all examples of linear transitions in the operating space. Though it should be understood that a coordinated transition need not be linear in other embodiments and may be non-linear.

Moreover, in certain embodiments, it should be understood that the central multi-dimensional operating space controller 258 may also include one or more functions to smooth transitions into and out of the multi-dimensional ramps to such a centralized function, and that logic to avoid certain areas of operating space along certain transition paths may also be added. Such functions are intended as rate slowing functions as a ramp action leaves an initial point in operating space, or arrives at a new point in operating space, such that not only the set point in each dimension remains a continuous function, but that the first or even high order derivatives of the set point in each dimension of operating space may be kept continuous, for smoothing of the transition.

In one embodiment, determination of the reduced power capability resulting from each requestor of modified operating space 252 set of modifications can be realized, for example, by taking a nominal reference case for all operating space dimensions as the baseline power production capability. Then, the system 250 can use available wind speed and model-based aerodynamics (maps or similar) to determine what maximum power is achieved at the maximum speed, maximum power, and maximum thrust (and all other operating space dimensional constraints) specified under the nominal case. Similarly, the system 250 can use available wind speed and model-based aerodynamics (maps or similar) to determine what maximum power is achieved at the maximum speed, maximum power, and maximum thrust (and all other operating space dimensional constraints) specified under each requestor of modified operating space 252 case. The system can then determine the energy lost or gained during each time period (controller cycle, second, minute, hour, etc.) under the changes imposed by each requestor of modified operating space 252 relative to the nominal case and can record or store the actual energy captured against the nominal case.

The system 250 is then configured to define an arbitrary value of total lost power that may represent the same power/energy loss multiple times from multiple requestors of modified operating space 252. Accordingly, the system 250 can then assign each requestor of modified operating space 252 a fraction of responsibility according to its fraction of the total lost power. Thus, the system 250 can define a true power/energy loss or gain relative to the nominal case by comparing the actual energy/power capture against the nominal case energy/power capture, referred to as the "nominal power" or "possible power." Moreover, the system 250 can increment energy loss counters according to the true power/energy loss or gain and the fraction of responsibility assigned to each requestor of modified operating space 252. It should be further understood that the system 250 may also be configured to increment energy loss counters according to the most limiting of all the requestors of modified operating space 252 from a power perspective, or through other designed assignment methods, rather than proportionally.

Accordingly, the central multi-dimensional operating space controller 258 of the present disclosure is capable of the completing operations that the independent parallel single-dimensional handlers (SDOSHs 1, 2, 3) of FIG. 1 could not realistically accomplish. As mentioned, one such operation may include the use of an on-board model to calculate the effects of all operating space dimensions on energy capture. Such a model may include one or more aerodynamic performance maps (e.g. look-up tables) of rotor performance that might inform optimal paths of multi-dimensional operating space transitions, models of electrical losses, and so forth. For obvious reasons, users of wind turbines and standards organizations governing wind turbines have interest in tracking which of the requestors of modified operating space 252 is restricting the overall energy capture (power production) at any point in time. Among other reasons, this allows users to rank reasons for energy loss and prioritize them for attention and allocation of maintenance and/or engineering resources.

For example, when all curtailments occur explicitly through a maximum power level, the central multi-dimensional operating space controller 258 can control the multi-dimensional operating space via a simple calculation. However, when multiple operating space dimensions are simultaneously reduced, this calculation becomes far more complex. For example, if speed is reduced and minimum (fine) pitch angle is increased, the central multi-dimensional operating space controller 258 can determine which of the dimensions is more limiting to power. Through the central multi-dimensional operating space controller 258, it becomes possible to use the on-board model to estimate the energy effects of the reductions requested by each of the requestors of modified operating space 252 and determine which is limiting to the overall energy. It is also possible to allocate shares of energy loss proportionally to various requestors of modified operating space 252 during concurrent requests.

Referring back to FIG. 6, once the central multi-dimensional operating space controller 258 determines the output signal 260, as shown at (108), the method 100 includes controlling the wind turbine 10 based on the output signal 260 so as to provide a modified multi-dimensional operating space. As such, the central multi-dimensional operating space controller 258 enables central management of transient paths from one operating space to a modified operating space, better managing transients in operation. With a uniform input format expected from each requestors of modified operating space 252, addition of a new requestor of modified operating space or addition of a dimensional request from an existing requestor of modified operating space 252 becomes a simpler change to the system than in alternate approaches. The central multi-dimensional operating space controller 258 may also be designed in a generalized fashion for a generic requestor of modified operating space 252 input and a generic multi-dimensional output (e.g. output signal 260) to the operating space regulation functions that can be used by the turbine control software (e.g. as shown via controller 26).

Various aspects and embodiments of the present invention are defined by the following numbered clauses:

Clause 1. A method for adjusting a multi-dimensional operating space of a wind turbine, the method comprising:
receiving, via a central multi-dimensional operating space controller, a plurality of signals from a plurality of requestors of modified operating space, each of the plurality of signals from the plurality of requestors of modified operating space comprising a data structure that includes requested set points for a plurality of dimensions in the operating space;
tracking, via the central multi-dimensional operating space controller, current set points for the plurality of dimensions in the operating space;
dynamically determining, via the central multi-dimensional operating space controller, an output signal based on the requested set points, the output signal comprising one or more changes for the current set points for the plurality of dimensions in the operating space; and,
controlling the wind turbine based on the output signal so as to provide a modified multi-dimensional operating space.

Clause 2. The method of clause 1, wherein dynamically determining the output signal based on the requested set points further comprises dynamically determining the output signal via a computer-implemented model stored in the central multi-dimensional operating space controller.

Clause 3. The method of any of the preceding clauses, wherein dynamically determining the output signal based on the requested set points further comprises tracking an effect of each of the plurality of signals from the plurality of requestors of modified operating space on at least one at least one of active power or reactive power.

Clause 4. The method of any of the preceding clauses, further comprising prioritizing, via the central multi-dimensional operating space controller, the plurality of signals from the plurality of requestors of modified operating space with respect to an operational aggression level of each of the plurality of signals.

Clause 5. The method of any of the preceding clauses, wherein dynamically determining the output signal based on the requested set points further comprises selecting, via the central multi-dimensional operating space controller, one of the data structures from the plurality of requestors of modified operating space based on the prioritization.

Clause 6. The method of any of the preceding clauses, further comprising dynamically determining, via the central multi-dimensional operating space controller, coordinated multi-dimensional transition paths in response to one or more changes between current and new set points for the plurality of dimensions in the operating space.

Clause 7. The method of any of the preceding clauses, further comprising:
receiving, via the central multi-dimensional operating space controller, a transition rate for each of the requested set points for the plurality of dimensions in the operating space; and
determining a limiting dimension of the plurality of dimensions of modified operating space with respect to the transition rates.

Clause 8. The method of any of the preceding clauses, further comprising coordinating the reducing of the transition rates of the plurality of requestors of modified operating space to effect a linear transition path between operating spaces.

Clause 9. The method of any of the preceding clauses, wherein coordinating the reducing of the transition rates of the plurality of requestors of modified operating space to effect the linear transition path between operating spaces further comprises reducing transition rates of the plurality of dimensions of modified operating space to a limited transition rate of the limiting dimension such that each of the plurality of dimensions of modified operating space begin and end transitioning at the same time.

Clause 10. The method of any of the preceding clauses, wherein the one or more changes for the current set points for the plurality of dimensions in the operating space further comprises at least one of a step increase or decrease or a dynamic increase or decrease.

Clause 11. The method of any of the preceding clauses, wherein each data structure of each of the plurality of signals from the plurality of requestors of modified operating space comprises a standard, identical format.

Clause 12. The method of any of the preceding clauses, wherein the requestors of the modified operating space originate from at least one of monitoring systems of components of the wind turbine, a management system of a wind farm containing the wind turbine, a management system outside of the wind farm, monitoring systems of wind conditions at the wind turbine or in the wind farm, or a power grid connected to the wind turbine or the wind farm.

Clause 13. The method of any of the preceding clauses, wherein the requestors of the modified operating space comprise at least one of temperature, grid curtailment, noise reduction, power curtailment, or sensor status.

Clause 14. The method of any of the preceding clauses, wherein the plurality of dimensions comprise at least one of tip speed ratio, rotor speed, generator speed, active power, reactive power, pitch angle, wind speed limits, or thrust.

Clause 15. A system for adjusting a multi-dimensional operating space of a wind turbine, the system comprising:
a plurality of requestors of modified operating space;
a central multi-dimensional operating space controller communicatively coupled to each of the requestors of modified operating space, the central multi-dimensional operating space controller configured to perform a plurality of operations, the plurality of operations comprising:
receiving a plurality of signals from the plurality of requestors of modified operating space, each of the plurality of signals from the plurality of requestors of modified operating space comprising a data structure that includes requested set points for a plurality of dimensions in the operating space;
tracking current set points for the plurality of dimensions in the operating space; and,
dynamically determining an output signal based on the requested set points, the output signal comprising one or more changes for the current set points for the plurality of dimensions in the operating space; and,
a controller communicatively coupled to the central multi-dimensional operating space controller, the controller configured to control the wind turbine based on the output signal so as to provide a modified multi-dimensional operating space.

Clause 16. The system of clause 15, wherein dynamically determining the output signal based on the requested set points further comprises dynamically determining the output signal via a computer-implemented model stored in the central multi-dimensional operating space controller.

Clause 17. The system of clauses 15-16, wherein dynamically determining the output signal based on the requested set points further comprises tracking an effect of each of the plurality of signals from the plurality of requestors of modified operating space on at least one at least one of active power or reactive power.

Clause 18. The system of clauses 15-17, further comprising prioritizing, via the central multi-dimensional operating space controller, the plurality of signals from the plurality of requestors of modified operating space with respect to an operational aggression level of each of the plurality of signals.

Clause 19. The system of clauses 15-18, wherein dynamically determining the output signal based on the requested set points further comprises selecting, via the central multi-dimensional operating space controller, one of the data structures from the plurality of requestors of modified operating space based on the prioritization such that at least one of the active power or the reactive power is maximized.

Clause 20. The system of clauses 15-19, further comprising dynamically determining, via the central multi-dimensional operating space controller, coordinated multi-dimensional transition paths in response to one or more changes between current and new set points for the plurality of dimensions in the operating space.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for adjusting a multi-dimensional operating space of a wind turbine, the method comprising:
receiving, via a central multi-dimensional operating space controller, a plurality of signals from a plurality of requestors of modified operating space, each of the plurality of signals from the plurality of requestors of modified operating space comprising a data structure that includes requested set points for a plurality of dimensions in the operating space;
tracking, via the central multi-dimensional operating space controller, current set points for the plurality of dimensions in the operating space;
dynamically determining, via the central multi-dimensional operating space controller, an output signal based on the requested set points, the output signal comprising one or more changes for the current set points for the plurality of dimensions in the operating space; and,
controlling the wind turbine based on the output signal so as to provide a modified multi-dimensional operating space.

2. The method of claim 1, wherein dynamically determining the output signal based on the requested set points further comprises dynamically determining the output signal via a computer-implemented model stored in the central multi-dimensional operating space controller.

3. The method of claim 1, wherein dynamically determining the output signal based on the requested set points further comprises tracking an effect of each of the plurality of signals from the plurality of requestors of modified operating space on at least one at least one of active power or reactive power.

4. The method of claim 1, further comprising prioritizing, via the central multi-dimensional operating space controller, the plurality of signals from the plurality of requestors of modified operating space with respect to an operational aggression level of each of the plurality of signals.

5. The method of claim 4, wherein dynamically determining the output signal based on the requested set points further comprises selecting, via the central multi-dimensional operating space controller, one of the data structures from the plurality of requestors of modified operating space based on the prioritization.

6. The method of claim 1, further comprising dynamically determining, via the central multi-dimensional operating space controller, coordinated multi-dimensional transition paths in response to one or more changes between current and new set points for the plurality of dimensions in the operating space.

7. The method of claim 1, further comprising:
receiving, via the central multi-dimensional operating space controller, a transition rate for each of the requested set points for the plurality of dimensions in the operating space; and
determining a limiting dimension of the plurality of dimensions of modified operating space with respect to the transition rates.

8. The method of claim 7, further comprising coordinating the reducing of the transition rates of the plurality of requestors of modified operating space to effect a linear transition path between operating spaces.

9. The method of claim 8, wherein coordinating the reducing of the transition rates of the plurality of requestors of modified operating space to effect the linear transition path between operating spaces further comprises reducing transition rates of the plurality of dimensions of modified operating space to a limited transition rate of the limiting dimension such that each of the plurality of dimensions of modified operating space begin and end transitioning at the same time.

10. The method of claim 1, wherein the one or more changes for the current set points for the plurality of dimensions in the operating space further comprises at least one of a step increase or decrease or a dynamic increase or decrease.

11. The method of claim 1, wherein each data structure of each of the plurality of signals from the plurality of requestors of modified operating space comprises a standard, identical format.

12. The method of claim 1, wherein the requestors of the modified operating space originate from at least one of monitoring systems of components of the wind turbine, a management system of a wind farm containing the wind turbine, a management system outside of the wind farm, monitoring systems of wind conditions at the wind turbine or in the wind farm, or a power grid connected to the wind turbine or the wind farm.

13. The method of claim 12, wherein the requestors of the modified operating space comprise at least one of temperature, grid curtailment, noise reduction, power curtailment, or sensor status.

14. The method of claim 1, wherein the plurality of dimensions comprise at least one of tip speed ratio, rotor speed, generator speed, active power, reactive power, pitch angle, wind speed limits, or thrust.

15. A system for adjusting a multi-dimensional operating space of a wind turbine, the system comprising:
a plurality of requestors of modified operating space;
a central multi-dimensional operating space controller communicatively coupled to each of the requestors of modified operating space, the central multi-dimensional operating space controller configured to perform a plurality of operations, the plurality of operations comprising:
receiving a plurality of signals from the plurality of requestors of modified operating space, each of the plurality of signals from the plurality of requestors of modified operating space comprising a data structure that includes requested set points for a plurality of dimensions in the operating space;
tracking current set points for the plurality of dimensions in the operating space; and,
dynamically determining an output signal based on the requested set points, the output signal comprising one or more changes for the current set points for the plurality of dimensions in the operating space; and,
a controller communicatively coupled to the central multi-dimensional operating space controller, the controller configured to control the wind turbine based on the output signal so as to provide a modified multi-dimensional operating space.

16. The system of claim 15, wherein dynamically determining the output signal based on the requested set points further comprises dynamically determining the output signal via a computer-implemented model stored in the central multi-dimensional operating space controller.

17. The system of claim 15, wherein dynamically determining the output signal based on the requested set points further comprises tracking an effect of each of the plurality of signals from the plurality of requestors of modified operating space on at least one at least one of active power or reactive power.

18. The system of claim 17, further comprising prioritizing, via the central multi-dimensional operating space controller, the plurality of signals from the plurality of requestors of modified operating space with respect to an operational aggression level of each of the plurality of signals.

19. The system of claim 18, wherein dynamically determining the output signal based on the requested set points further comprises selecting, via the central multi-dimensional operating space controller, one of the data structures from the plurality of requestors of modified operating space based on the prioritization such that at least one of the active power or the reactive power is maximized.

20. The system of claim 15, further comprising dynamically determining, via the central multi-dimensional operating space controller, coordinated multi-dimensional transition paths in response to one or more changes between current and new set points for the plurality of dimensions in the operating space.

* * * * *